United States Patent
Matsunami et al.

(10) Patent No.: US 9,738,559 B2
(45) Date of Patent: Aug. 22, 2017

(54) HEAT RAY-SHIELDING MATERIAL

(75) Inventors: Yuki Matsunami, Kanagawa (JP);
Naoharu Kiyoto, Kanagawa (JP);
Shinya Hakuta, Kanagawa (JP);
Takeharu Tani, Kanagawa (JP);
Masayuki Naya, Kanagawa (JP); Koh Kamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 215 days.

(21) Appl. No.: 12/940,374

(22) Filed: Nov. 5, 2010

(65) Prior Publication Data

US 2011/0111210 A1 May 12, 2011

(30) Foreign Application Priority Data

Nov. 6, 2009 (JP) .................. 2009-255032
Jun. 3, 2010 (JP) .................. 2010-127679

(51) Int. Cl.
G02B 1/00 (2006.01)
C03C 17/00 (2006.01)
C03C 17/42 (2006.01)
G02B 5/20 (2006.01)

(52) U.S. Cl.
CPC .......... *C03C 17/007* (2013.01); *C03C 17/008* (2013.01); *C03C 17/42* (2013.01); *G02B 5/208* (2013.01); *C03C 2217/465* (2013.01); *C03C 2217/479* (2013.01); *Y10T 428/256* (2015.01)

(58) Field of Classification Search
CPC ............ C03C 17/007; C03C 2217/479; C03C 2217/465; C03C 17/42; C03C 17/008; G02B 5/208; Y10T 428/256

USPC .......................................... 428/323; 252/587
See application file for complete search history.

(56) References Cited

U.S. PATENT DOCUMENTS

| | | | | |
|---|---|---|---|---|
| 5,040,838 A | * | 8/1991 | Yoshizawa | 296/84.1 |
| 5,943,156 A | * | 8/1999 | Komuro et al. | 359/280 |
| 6,649,256 B1 | * | 11/2003 | Buczek et al. | 428/323 |
| 6,689,256 B2 | | 2/2004 | Nakashima et al. | |
| 7,604,855 B2 | * | 10/2009 | Raksha et al. | 428/195.1 |
| 2002/0142149 A1 | | 10/2002 | Nakashima et al. | |
| 2003/0039842 A1 | | 2/2003 | Nakishima et al. | |
| 2007/0048519 A1 | | 3/2007 | Anderson et al. | |

(Continued)

FOREIGN PATENT DOCUMENTS

| CN | 101341218 A | 1/2009 |
|---|---|---|
| JP | 3454422 B2 | 7/2003 |

(Continued)

OTHER PUBLICATIONS

"Main," accessed Aug. 10, 2015, The Free Dictionary, http://www.thefreedictionary.com/Main.*

(Continued)

*Primary Examiner* — Nicholas Kokkinos
(74) *Attorney, Agent, or Firm* — Birch, Stewart, Kolasch & Birch, LLP

(57) ABSTRACT

A heat ray-shielding material including a metal particle-containing layer containing at least one kind of metal particle. The metal particle contains substantially hexagonal or substantially discoidal metallic flat particles in an amount of 60% by number or more. The main planes of the metallic flat particles are oriented at an angle ranging from 0° to ±30° relative to one surface of the metal particle-containing layer.

8 Claims, 5 Drawing Sheets

(56) References Cited

U.S. PATENT DOCUMENTS

| | | | |
|---|---|---|---|
| 2008/0295737 A1 | 12/2008 | Henglein et al. | |
| 2009/0159858 A1* | 6/2009 | Noguchi et al. | 252/587 |
| 2009/0219528 A1* | 9/2009 | Chamberlin et al. | 356/319 |
| 2010/0220388 A1* | 9/2010 | Suzuki et al. | 359/359 |

FOREIGN PATENT DOCUMENTS

| | | | |
|---|---|---|---|
| JP | 2005-15647 A | | 1/2005 |
| JP | 2007-108536 A | | 4/2007 |
| JP | 2007-138249 A | | 6/2007 |
| JP | 2007-138250 A | | 6/2007 |
| JP | 2007-154292 A | | 6/2007 |
| JP | 2007-178915 A | | 7/2007 |
| JP | 2009-520844 A | | 5/2009 |
| WO | WO2008149974 | * | 12/2008 |

OTHER PUBLICATIONS

Japanese Patent Office Action dated Mar. 18, 2014 issued in Japanese Patent Application No. JP 2010-127679, including partial English language translation.
Chinese Office Action for Chinese Application No. 201010535056.9, dated Jan. 6, 2014, with an English translation.
Japanese Office Action for Appl. No. 2010-127679 dated Oct. 22, 2013 (w/ partial English translation).
Extended European Search Report dated Mar. 22, 2016, issued in corresponding European Patent Application No. 10190131.2.

* cited by examiner

HEAT RAY-SHIELDING MATERIAL

BACKGROUND OF THE INVENTION

Field of the Invention

The present invention relates to a heat ray-shielding material which has wide reflection wavelength selectivity and a wide reflection frequency band and is excellent in visible light transmission and radio wave transmission.

Description of the Related Art

In recent years, as one of energy saving measures to reduce carbon dioxide emissions, there have been developed heat-ray shielding materials for windows for buildings and automobiles. From the viewpoint of heat ray-shielding properties (solar radiation heat-acquisition rate), materials of heat ray reflective type which produces no reradiation of heat are more desired than heat absorbing materials which reradiates absorbed light into rooms (in an amount of about ⅓ of the solar radiation energy absorbed), and various techniques have been proposed.

For example, Ag metal thin films are generally used as heat ray-reflecting materials for their high reflectance, however, reflect not only visible light and heat rays but also radio waves, and thus such films have problems with their low visible light transmission and low radio wave transmission. To increase the visible light transmission, Low-E-glass (e.g., produced by Asahi Glass Co., Ltd.) utilizing an Ag—ZnO-multilayered film are widely adopted in buildings. However, Low-E glass has a problem with its low radio wave transmission, because an Ag metal thin film is formed on a surface of the glass.

To solve the above problems, for example, there has been an island-shaped Ag particle-attached glass to which radio wave transmission is imparted. There has been proposed a glass, in which granular Ag is formed, by annealing an Ag thin film formed by vapor deposition (see Japanese Patent (JP-B) No. 3454422). However, in this proposal, since granular-shaped Ag is formed by annealing, there are problems in that it is difficult to control the size and the shape of particles, and the area ratio, to control the reflection wavelength and reflection frequency band of heat ray and to increase the visible light transmissivity.

Further, there have been proposed filters using Ag flat-shaped particles as an infrared ray-shielding filters (see Japanese Patent Application Laid-Open (JP-A) Nos. 2007-108536, 2007-178915, 2007-138249, 2007-138250, and 2007-154292). However, these proposals are each intended to be used in plasma display panels, and use particles of small volume in order to improve the absorptivity of light in the infrared wavelength range, and the Ag flat-shaped particles are not used as a material to shield heat rays (material reflecting heat rays).

BRIEF SUMMARY OF THE INVENTION

An object of the present invention is to provide a heat ray-shielding material which has wide reflection wavelength selectivity and a wide reflection frequency band and is excellent in visible light transmission and radio wave transmission.

The present inventors carried out extensive studies and examinations to solve the above-mentioned problems and have found that substantially hexagonal or substantially discoidal flat metal particles are oriented substantially horizontally with respect to a substrate surface, thereby the problems can be effectively solved.

The present invention has been made based on the findings of the present inventors. Means for solving the above problems are as follows:

<1> A heat ray-shielding material including:
a metal particle-containing layer containing at least one kind of metal particle,
wherein the metal particle contains substantially hexagonal or substantially discoidal metallic flat particles in an amount of 60% by number or more, and the main planes of the metallic flat particles are oriented at an angle ranging from 0° to ±30° relative to one surface of the metal particle-containing layer.

<2> The heat ray-shielding material according to <1> above, wherein a coefficient of variation of a particle size distribution of the metallic flat particles is 30% or less.

<3> The heat ray-shielding material according to one of <1> and <2> above, wherein the metallic flat particles have an average particle diameter of 70 nm to 500 nm and an aspect ratio of the average particle diameter to an average particle thickness of 2 to 80.

<4> The heat ray-shielding material according to any one of <1> to <3> above, wherein the metallic flat particles contain at least silver.

<5> The heat ray-shielding material according to any one of <1> to <4> above, wherein when a plasmon resonance wavelength of a metal constituting the metallic flat particles in the metal particle-containing layer is represented by $\lambda$ and an refractive index of a medium in the metal particle-containing layer is represented by n, the metal particle-containing layer is present in a range of $(\lambda/n)/4$ in a depth direction from the horizontal surface of the heat ray-shielding material.

<6> The heat ray-shielding material according to any one of <1> to <5> above, wherein when the metal particle-containing layer is viewed from a perpendicular direction, an area ratio $[(B/A) \times 100]$ is 15% or more, where A is a total projected area of the metal particle-containing layer, and B is a sum value of projected areas of the metallic flat particles.

<7> The heat ray-shielding material according to any one of <3> to <6> above, wherein an average inter-particle distance of the metallic flat particles present adjacent to each other in a horizontal direction of the metal particle-containing layer is 1/10 or more of the average particle diameter of the metallic flat particles.

<8> The heat ray-shielding material according to any one of <1> to <7> above, wherein a plurality of the metal particle-containing layers are laminated, and a distance between the metal particle-containing layers present adjacent to each other is 15 µm or more.

<9> The heat ray-shielding material according to any one of claims <1> to <8> above, wherein the metallic flat particles are coated with a high refractive index material.

<10> The heat ray-shielding material according to any one of <1> to <9> above, wherein the heat ray-shielding material has a maximum value of solar radiation reflectance in a wavelength range of 600 nm to 2,000 nm.

<11> The heat ray-shielding material according to any one of <1> to <10> above, wherein the heat-ray shielding material has a visible light transmittance of 60% or higher.

The present invention can solve the above-mentioned conventional problems, achieve the object and provide a heat ray-shielding material which has wide reflection wavelength selectivity and a wide reflection frequency band and is excellent in visible light transmission and radio wave transmission.

Figure 1A:
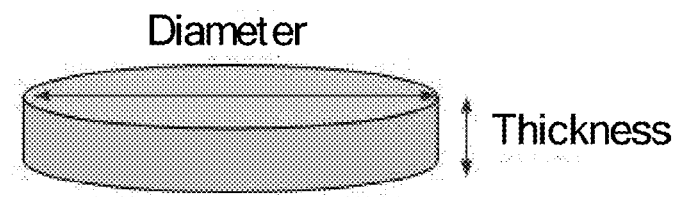
FIG. 1A is a schematic perspective view illustrating one example of the shape of flat particles contained in a heat ray-shielding material according to the present invention, and illustrates a substantially discoidal flat particle.

DETAILED DESCRIPTION OF THE INVENTION (Heat Ray-Shielding Material)

A heat ray-shielding material according to the present invention has a metal particle-containing layer containing at least one metal particle, a substrate, and has other materials as required.

<Metal Particle-Containing Layer>

The metal particle-containing layer is not particularly limited, as long as it is a layer containing at least one kind of metal particle, and may be suitably selected in accordance with the intended use.

—Metal Particle—

The metal particle is not particularly limited, as long as it contains flat particles made of metal (hereinafter, may be referred to as "metal flat particle(s)"), and may be suitably selected in accordance with the intended use. For example, besides flat particles, granular particles, cubic-shaped particles, hexagonal-shaped particles, octahedral-shaped particles, and rod-shaped particles are exemplified.

In the metal particle-containing layer, the state of the metal particles in the heat ray-shielding material is not particularly limited, as long as the metal particles are eccentrically located substantially horizontally with respect to one surface of the metal particle-containing layer (when the metal particle-containing layer has a substrate, the metal particles are eccentrically located substantially horizontally with respect to a substrate surface), and may be suitably selected in accordance with the intended use. Examples thereof include an embodiment in which a substrate is substantially in contact with metal particles, and an embodiment in which a substrate and metal particles are arranged at a certain distance in a depth direction of the heat ray-shielding material.

Note that the "one surface of the metal particle-containing layer" is a plane contacting with a substrate serving as a temporary support, and is a flat plane similarly to the surface of the substrate. Here, the heat ray-shielding material may include the temporary support or may not include it.

The size of the metal particle is not particularly limited and may be suitably selected in accordance with the intended use. For example, the particle may have an average particle diameter of 500 nm or smaller.

The material for use in the metal particle is not particularly limited and may be suitably selected in accordance with the intended use. For example, silver, gold, aluminum, copper, rhodium, nickel, platinum and the like are preferable from the viewpoint of having a high reflectance to heat-ray (infrared ray).

—Metallic Flat Particle—

The metallic flat particle is not particularly limited, as long as it is a particle including two principal planes (see FIGS. 1A and 1B), and may be suitably selected in accordance with the intended use. For example, a substantially hexagonal shape, a substantially disc shape, a substantially triangular shape etc. are exemplified. Among these shapes, particularly preferably, the metallic flat particle has a substantially hexagonal shape or a substantially disc shape.

The substantially disc-shape is not particularly limited, as long as when the metallic flat particle is observed above the primary plane, the metallic flat particle has a rounded shape without having angles, and may be suitably selected in accordance with the intended use.

The substantially hexagonal shape is not particularly limited, as long as when the metallic flat particle is observed above the primary plane, the shape is a substantially hexagonal, and may be suitably selected in accordance with the intended use. For example, angles of the hexagonal shape may be acute angles or obtuse angles, however, in light of mitigating absorption of light having a wavelength in the visible light region, the metallic flat particle preferably have obtuse angles. The degree of obtuseness is not particularly limited and may be suitably selected in accordance with the intended use.

Among metallic particles present in the metal particle-containing layer, metallic flat particles having a substantially hexagonal shape or a substantially disc shape are contained in an amount of 60% by number or more, preferably 65% by number or more, and still more preferably 70% by number or more to the total number of metallic particles. When the ratio of the metallic flat particles is less than 60% by number, the visible light transmittance may decrease.

[Plane Orientation]

In one aspect of the heat ray-shielding material of the present invention, the primary plane of the metallic flat particle is oriented in a predetermined range with respect to one surface of the metal particle-containing layer (in the case where the heat ray-shielding material has a substrate, with respect to the surface of the substrate).

Figure 3A:
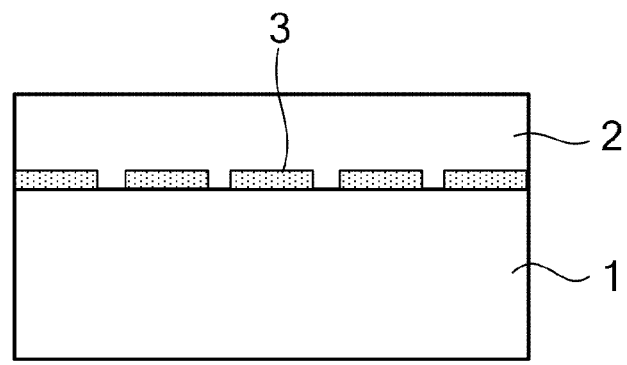
FIG. 3A is a schematic cross-sectional view illustrating the state where a metal particle-containing layer containing metal flat particles is present in a heat ray-shielding material according to the present invention, and a view for illustrating the most ideal state.

The state of the metallic flat particle is not particularly limited and may be suitably selected in accordance with the intended use, however, the metallic flat particles are preferably arrayed on a substrate, as illustrated in FIG. 3A described below.

The plane orientation is not particularly limited, as long as it is according to an aspect where the primary plane of the metallic flat particle is arrayed, in a predetermined range, substantially parallel with one surface of the metal particle-containing layer (in the case where the heat ray-shielding material has a substrate, the surface of the substrate), and may be suitably selected in accordance with the intended use. The angle of the plane orientation is 0°±30°, and preferably 0°±20°.

Figure 3B:
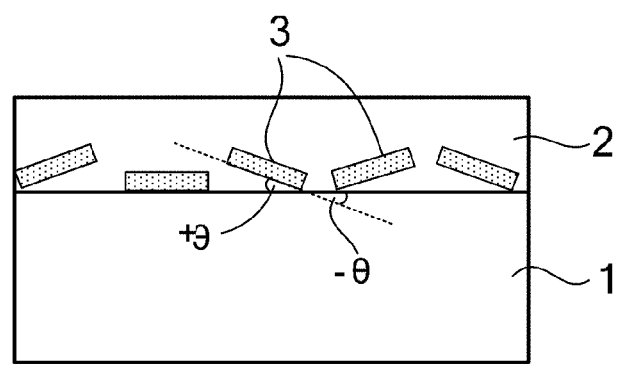
FIG. 3B is a schematic cross-sectional view illustrating the state where a metal particle-containing layer containing metal flat particles is present in a heat ray-shielding material according to the present invention, and a view for illustrating an angle (θ) formed between the place of a substrate surface and the plane of flat particles.
Figure 3C:
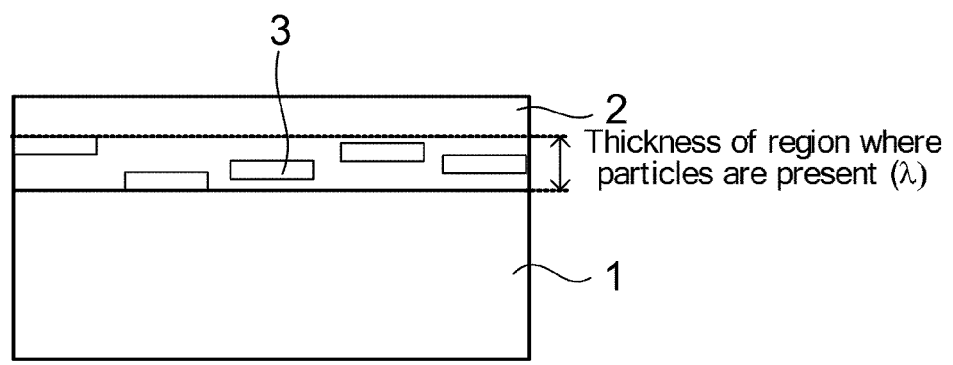
FIG. 3C is a schematic cross-sectional view illustrating the state where a metal particle-containing layer containing metal flat particles is present in a heat ray-shielding material according to the present invention, and a view for illustrating a region where the metal particle-containing layer is present in a depth direction of the heat ray-shielding material.

Here, FIGS. 3A to 3C are schematic cross-sectional views each illustrating the state where a metal particle-containing layer containing metallic flat particles is present in a heat ray-shielding material of the present invention. FIG. 3A illustrates the most ideal state of metallic flat particles 3 in a metal particle-containing layer 2. FIG. 3B is a view for illustrating an angle (±θ) formed between the plane of a substrate 1 and the plane of the metallic flat particle 3. FIG. 3C is a view for illustrating the region where the metal particle-containing layer 2 is present in a depth direction of the heat ray-shielding material.

In FIG. 3B, the angle (±θ) formed between the surface of the substrate 1 and the primary plane of the metallic flat particle 3 or an extended line of the primary plane corresponds to the predetermined range in the plane orientation. In other words, the plane orientation designates a state where when a cross-section of the heat ray-shielding material is observed, a tilt angle (±θ) illustrated in FIG. 3B is small. In particular, FIG. 3A illustrates a state where the primary plane of the metallic flat particle 3 is in contact with the surface of the substrate 1, that is, illustrates a state where θ is 0°. When an angle of plane orientation of the primary plane of the metallic flat particle 3 with respect to the surface of the substrate 1, that is, θ in FIG. 3B, exceeds the range of ±30°, the reflectance of the heat ray-shielding material at a specific wavelength (e.g. a wavelength in the near-infrared wavelength region from the visible light wavelength region) may decrease, and the haze may increase.

[Evaluation of Plane Orientation]

The evaluation method for determining whether or not the primary plane of the metallic flat particle is oriented with respect to one surface of the metal particle-containing layer (in the case where the heat ray-shielding material has a substrate, the surface of the substrate itself) is not particularly limited and may be suitably selected in accordance with the intended use. For example, it may be an evaluation method in which an appropriate cross-section slice is produced, and the metal particle-containing layer (in the case where the heat ray-shielding material has a substrate, the substrate itself) and the metallic flat particle in the slice are observed. More specifically, a cross-sectional sample or a cross-section slice sample of the heat ray-shielding material is prepared using a microtome or a focused ion beam (FIB), the sample is observed through various microscopes (e.g., filed-emission-type scanning electron microscope (FE-SEM)) to obtain images, and the plane orientation is evaluated from the obtained images.

When in the heat ray-shielding material, a binder for use to cover the metallic flat particle is swollen with water, a sample frozen with a liquid nitrogen is cut with a diamond cutter attached on a microtome, and thereby the cross-sectional sample or cross-section slice sample may be prepared. When in the heat ray-shielding material, a binder for use to cover the metallic flat particle is not swollen with water, the above-mentioned cross-section sample or cross-section slice sample may be prepared as described above.

The method of observing the cross-section sample or cross-section slice sample prepared as above is not particularly limited, as long as whether or not the primary plane of the metallic flat particle is oriented with respect to one surface of the metal particle-containing layer (in the case where the heat ray-shielding material has a substrate, the surface of the substrate) in the sample can be determined, and may be suitably selected in accordance with the intended use. For example, observing methods using an FE-SEM, a TEM, an optical microscope or the like are exemplified. In the case of the cross-section sample, the plane orientation may be observed through an FE-SEM, and in the case of the cross-section slice sample, the plane orientation may be observed through a TEM. When the plane orientation is evaluated through an FE-SEM, the FE-SEM preferably has special resolution whereby the shape of the metallic flat particle and the tilt angle (±θ in FIG. 3B) can be clearly determined.

[Average Particle Diameter (Average Circle-Equivalent Diameter) and Particle Size Distribution of Average Particle Diameter (Average Circle-Equivalent-Diameter)]

The average particle diameter (average circle-equivalent diameter) of the metallic flat particles is not particularly limited and may be suitably selected in accordance with the intended use. It is, however, preferably 70 nm to 500 nm, and more preferably 100 nm to 400 nm. When the average particle diameter (average circle-equivalent diameter) is smaller than 70 nm, the contribution of absorption of the metallic flat particle is greater than the contribution to reflection, and thus a sufficient heat-ray reflectivity may not be obtained. When the average particle diameter (average circle-equivalent diameter) is greater than 500 nm, haze (light scattering) is increased, and the transparency of the substrate may be impaired.

Here, the term "average particle diameter (circle-equivalent diameter) means an average value of primary plane diameters (maximum lengths) of 200 flat particles arbitrarily selected from images obtained by observing particles through a TEM.

Two or more types of metal particles having a different average particle is diameter (average circle-equivalent diameter) may be incorporated into the metal particle-containing layer. In this case, there may be two or more peaks of average particle diameters (average circle-equivalent diameters) of metal particles, in other words, metal particles may have two average particle diameters (average circle-equivalent diameters).

In the heat ray-shielding material of the present invention, the coefficient of variation in a particle size distribution of metallic flat particles is preferably 30% or lower, and more preferably 10% or lower. When the coefficient of variation is higher than 30%, the heat ray-reflecting wavelength range in the heat ray-shielding material may become broader.

Here, the coefficient of variation in the particle size distribution of the metallic flat particle is a value (%), which is obtained, for example, by plotting the distribution range of particle diameters of 200 metallic flat particles used in calculation for the average value obtained as described above to determine a standard deviation based on the particle size distribution, and diving the standard deviation by the average value (average particle diameter (average circle-equivalent diameter)) of primary plane diameters (maximum lengths) obtained above.

[Aspect Ratio]

The aspect ratio of the metallic flat particles is not particularly limited and may be suitably selected in accordance with the intended use. From the viewpoint that the reflectance at a wavelength in the near-infrared wavelength region from the visible light wavelength region becomes high, it is preferably 2 to 80, and more preferably 4 to 60. When the aspect ratio is less than 2, the reflecting wavelength is smaller than 500 nm, and when the aspect ratio is more than 80, the reflecting wavelength is greater than 2,000 nm, and a sufficient heat ray reflectivity may not be obtained.

Figure 1B:
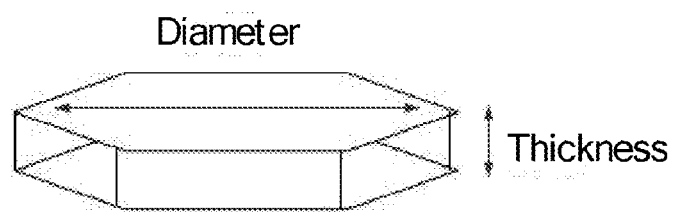
FIG. 1B is a schematic perspective view illustrating one example of the shape of flat particles contained in a heat ray-shielding material according to the present invention, and illustrates a substantially hexagonal, flat particle.
Figure 2:
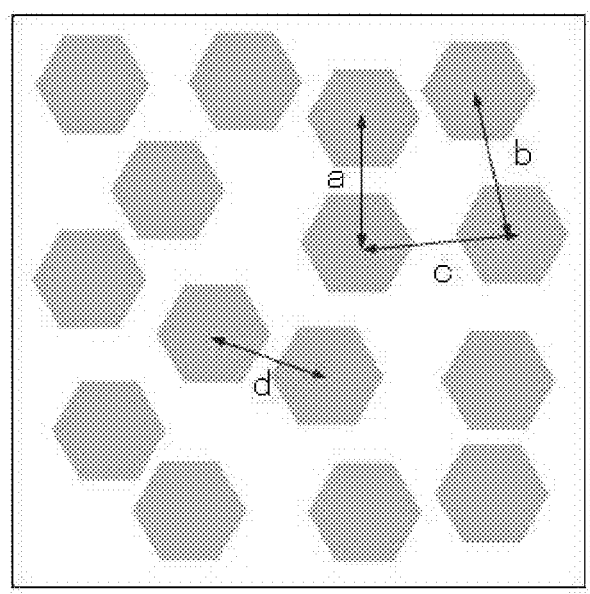
FIG. 2 is a schematic plane view illustrating an aspect of arrangement of flat particles in a heat ray-shielding material according to the present invention.

The aspect ratio means a value obtained by dividing an average particle diameter (average circle-equivalent diameter) of the metallic flat particles by an average particle thickness of the metallic flat particles. The average particle thickness corresponds to a distance between the primary plates of each of the metallic flat particles, for example, is illustrated in FIGS. 1A and 1B, and the aspect ratio can be measured by an atomic force microscope (AFM).

The measuring method of the average particle thickness through use of the AFM is not particularly limited and may be suitably selected in accordance with the intended use. For example, there may be exemplified a method in which a particle dispersion liquid containing metallic flat particles is delivered by drops onto a glass substrate, dried, and then the thickness of one particle is measured.

[Existing Range of Metallic Flat Particle]

In the heat ray-shielding material of the present invention, as illustrated in FIG. 3C, when a plasmon resonance wavelength of a metal constituting the metallic flat particles 3 in the metal particle-containing layer 2 is represented by $\lambda$ and an refractive index of a medium in the metal particle-containing layer 2 is represented by n, the metal particle-containing layer 2 is preferably present in a range of $(\lambda/n)/4$ in a depth direction from the horizontal surface of the heat ray-shielding material. If the metal particle-containing layer 2 is present outside this range, effect of increasing vibration wave amplitude during successive wavelength cycles is reduced by a phase difference between the reflection waves at air-interfaces of each silver layer provided at the upper side and under side of the heat ray-shielding material, and the haze properties, the visible light transmittance and the maximum reflectance for heat ray may decrease.

The plasmon resonance wavelength of a metal constituting the metallic flat to particles in the metal particle-containing layer is not particularly limited and may be suitably selected in accordance with the intended use. From the viewpoint of imparting heat-ray reflectivity, the plasmon resonance wavelength is preferably 400 nm to 2,500 nm, and from the viewpoint of imparting visible light transmittance, it is more preferably 700 nm to 2,500 nm.

The medium in the metal particle-containing layer is not particularly limited and may be suitably selected in accordance with the intended use. Examples thereof include polymers such as polyvinyl acetal resins, polyvinyl alcohol resins, polyvinyl butyral resins, polyacrylate resins, polymethacrylate resins, polycarbonate resins, polyvinyl chloride resins, saturated polyester resins, polyurethane resins; natural polymers (e.g., gelatin, and cellulose); and inorganic materials (e.g., silicon dioxide, and aluminum oxide).

The refractive index n of the medium is preferably 1.4 to 1.7.

[Area Ratio of Metallic Flat Particles]

An area ratio [(B/A)×100], which is a ratio of a sum value B of projected areas of the metallic flat particles relative to an area A of the substrate when the heat ray-shielding material was viewed from above (a total projected area A of the metal particle-containing layer when viewed from a perpendicular direction relative to the metal particle-containing layer), is preferably 15% or more, and more preferably 20% or more. When the area ratio is less than 15%, the maximum reflectance for heat ray decreases, and a sufficient heat-shielding effect may not be obtained.

Here, the area ratio can be measured by processing, for example, an image obtained by observing, from above, the heat ray-shielding material substrate through a SEM, and an image obtained by observing, from above, the heat ray-shielding material substrate through an AFM (atomic force microscope).

[Average Inter-Particle Distance of Metallic Flat Particles]

The average inter-particle distance between adjacent metallic flat particles in the metal particle-containing layer in the horizontal direction thereof is preferably $1/10$ or more the average particle diameter of the metallic flat particles, from the viewpoint of the visible light transmittance and the maximum reflectance for heat ray.

When the average inter-particle distance of the metallic flat particles in the horizontal direction thereof is less than $1/10$ the average particle diameter of the metallic flat particles, the maximum reflectance for heat ray decreases. In addition, the inter-particle distance of the metallic flat particles in the horizontal direction thereof is preferably non-uniform (random). If the inter-particle distance is not random, that is, is uniform, visible light is absorbed, and the transmittance may decrease.

Here, the term "average inter-particle distance in the horizontal direction of the metallic flat particles" means an average value of a distance between adjacent two particles. In addition, the wording "the average inter-particle distance is random" means that "when a two-dimensional autocorrelation is performed on the brightness value obtained by binarizing a SEM image in which 100 or more metallic flat particles are included, the obtained curve does not have a significant local maximum point except for the origin point".

[Distance Between Adjacent Metal Particle-Containing Layers]

In the heat ray-shielding material of the present invention, metallic flat particles are arranged in the form of a metal particle-containing layer containing the metallic flat particles, as illustrated in FIGS. 3A to 3C and FIG. 4.

Figure 4:
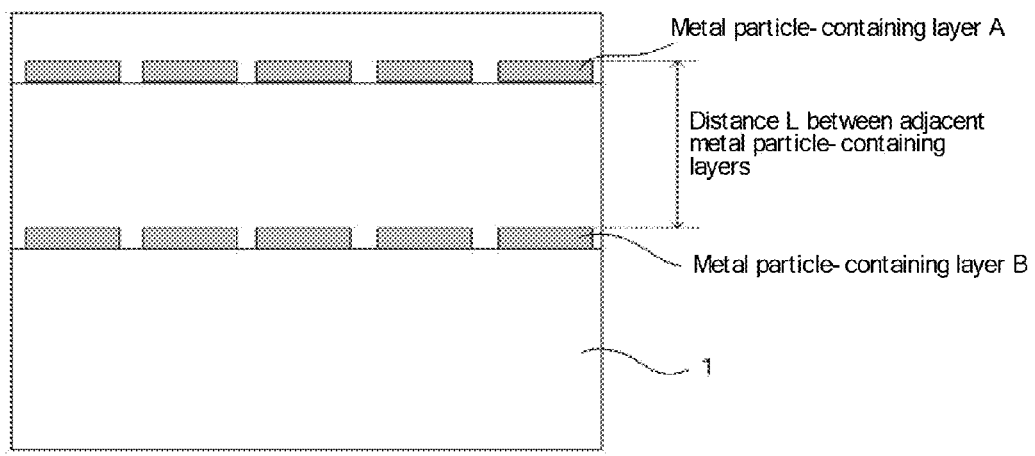
FIG. 4 is a schematic cross-sectional view illustrating a heat ray-shielding material having a plurality of metal particle-containing layers.

The metal particle-containing layer may be formed into a single layer structure as illustrated in FIGS. 3A to 3C, or a multilayered structure having a plurality of metal particle-containing layers as illustrated in FIG. 4. When the metal particle-containing layer is formed to be a multilayered structure having a plurality of layers as illustrated in FIG. 4, it is possible to impart a shielding ability according to the wavelength band region to be provided with the shielding ability.

When a plurality of metal particle-containing layers are laminated, the distance between adjacent metal particle-containing layers is preferably 15 μm or longer, in light of suppressing multiple scattering.

Here, the distance L between adjacent metal particle-containing layers represents a distance between a metal particle-containing layer A and a metal particle-containing layer B in FIG. 4.

When the distance between adjacent metal particle-containing layers is shorter than 15 μm, the pitch width of an interference peak of the metallic flat particles is greater than $1/10$ the half-value width (about 300 nm to about 400 nm) of resonance peak of the metal particle-containing layer containing the metallic flat particles, and unfavorably, this influences on the reflection spectrum.

Here, the distance between adjacent metal particle-containing layers can be measured, for example, using an image obtained by observing a cross-section sample of the heat ray-shielding material through a SEM.

[Synthesis Method of Metallic Flat Particle]

The synthesis method of the metallic flat particles is not particularly limited, as long as the particles can be synthesized into a substantially hexagonal shape or a substantially disc shape, and may be suitably selected in accordance with the intended use. Examples of the synthesis method include liquid phase methods such as a chemical reduction method, a photochemical reduction method, and an electrochemical reduction method. Among these methods, liquid phase methods such as the chemical reduction method and photochemical reduction method are particularly preferable in terms of controllability of the shape and size of particles. After hexagonal shape or triangular shape metallic flat particles are synthesized, for example, the particles are subjected to an etching treatment with solution species (e.g., nitric acid, and sodium sulfite) for dissolving silver, etc. or an aging treatment under heating, to form the hexagonal shape or triangular shape metallic flat particles so as to have obtuse angles, thereby substantially hexagonal or substantially discoidal flat particles may be obtained.

As the synthesis method of the metallic flat particles, seed crystals are preliminarily fixed on the surface of a transparent base material (e.g., a film and glass), and metal particles (e.g., Ag) may be formed through crystal growth into flat shape.

In the heat ray-shielding material of the present invention, the metallic flat particles may be subjected to a further treatment for imparting desired properties. The further treatment is not particularly limited and may be suitably selected in accordance with the intended use. Examples thereof include formation of a high-refractive-index-shell layer, and addition of various additives such as a dispersant and an antioxidant.

—Formation of High-Refractive-Index-Shell Layer—

To further improve the transparency in the visible light region, the metallic flat particles may be coated with a high refractive index material which has high transparency in the visible light region.

The high refractive index material is not particularly limited and may be suitably selected in accordance with the intended use. Examples thereof include $TiO_x$, $BaTiO_3$, $ZnO$, $SnO_2$, $ZrO_2$, and $NbO_x$.

The coating method is not particularly limited and may be suitably selected in accordance with the intended use. For example, it may be a method of forming a $TiO_x$ layer on surface of metallic flat particles made of silver by hydrolysis of tetrabutoxy titanium, as reported by Langmuir, on pp. 2731-2735, Vol. 16 in 2000.

In addition, when it is difficult to directly form a high-refractive-index metal oxide shell layer on metallic flat particles, metallic flat particles are synthesized as described above, a shell layer of $SiO_2$ or polymer is suitably formed on the particles, and then the metal oxide layer may be further formed on the shell layer. When $TiO_x$ is used as a material of the high-refractive-index metal oxide layer, there is apprehension that photocatalytic activity possessed by $TiO_x$ may deteriorate a matrix in which the metallic flat particles are dispersed, and thus after a $TiO_x$ layer is formed on the metallic flat particles, an $SiO_2$ layer may be suitably formed thereon, as required.

—Addition of Various Additives—

In the heat ray-shielding material of the present invention, to prevent oxidation of metals constituting the metallic flat particles, such as silver, antioxidants (e.g., mercaptotetrazole, and ascorbic acid) may be adsorbed into the metallic flat particles. Further, for the purpose of preventing oxidation, an oxidation sacrificial layer (e.g., Ni) may be formed on surface of the metallic flat particles. Additionally, for the purpose of blocking oxygen, the metallic flat particles may be coated with a metal oxide film made of $SiO_2$.

For the purpose of imparting dispersibility to the metallic flat particles, low-molecular-weight dispersants containing N, S, and P elements, for example, a quaternary ammonium salt, amines, a high-molecular-weight dispersant may be added thereto.

<Substrate>

The substrate is not particularly limited, as long as it is an optically transparent substrate, and may be suitably selected in accordance with the intended use. For example, substrates with a visible light transmissivity of 70% or higher, preferably 80% or higher or substrates with high transmissivity in the near-infrared wavelength region are exemplified.

The material for use in the substrate is not particularly limited and may be suitably selected in accordance with the intended use. Examples thereof include glass materials (e.g., white plate glass, and blue plate glass), polyethylene terephthalate (PET), and triacetylcellulose (TAC).

[Method for Producing Heat Ray-Shielding Material]

The method for producing a heat ray-shielding material according to the present invention is not particularly limited and may be suitably selected in accordance with the intended use. For example, there may be exemplified a coating method, in which a dispersion liquid containing metallic flat particles is applied onto a substrate by a coating method (e.g., dip coater, die coater, slit coater, bar coater, and gravure coater); LB film forming method, self-organizing method, and spray coating, so as to be oriented on the substrate.

In addition, to improve the adsorption properties of metallic flat particles to a surface of metallic flat particles and the plane orientation thereof, the metallic plane particles may be oriented utilizing electrostatic interaction. More specifically, when surfaces of the metallic flat particles are negatively charged (e.g., in a state where the metallic flat particles are dispersed in a negatively charged medium such as a citric acid), the metallic flat particles may be oriented by positively charging the surface of the substrate beforehand (e.g., the surface of the substrate is modified with amino acid, etc.) to improve the plane orientation of the metallic flat particles electrostatically. When the surfaces of the metallic flat particles are hydrophilic, a sea-island structure of hydrophilic/hydrophobic water is formed on the surface of the substrate using a block polymer, μ-contact stamping method or the like, and the plane orientation and the inter-particle distance of the metallic flat particles may be controlled utilizing hydrophilic/hydrophobic interaction.

To accelerate the plane orientation, after the metallic flat particles are applied onto the substrate, the substrate may be passed through a pressure roller such as a calender roller, and a laminate roller.

<Other Members>

<<Protective Layer>>

To improve the adhesion with the substrate and increase the mechanical strength, the heat ray-shielding material of the present invention preferably has a protective layer.

The protective layer is not particularly limited, and may be suitably selected in accordance with the intended use. For example, the protective layer contains a binder, a surfactant, and a viscosity modifier, and further contains other components as required.

—Binder—

The binder is not particularly limited, and may be suitably selected in accordance with the intended use. It is, however, preferably has high visible light transparency and high solar radiation transparency, and examples of such materials include acrylic resins, polyvinyl butyral, and polyvinyl alcohol. Note that when the binder absorbs heat ray, the reflection effect of the metallic flat particles becomes weak, and thus when an intermediate layer is formed between a heat ray source and the metallic flat particles, it is preferable that a material having no absorption in the wavelength range of from 780 nm to 1,500 nm be selected, and the protective layer be formed to be thin.

The heat ray-shielding material of the present invention preferably has a maximum solar radiation reflectance ranging from 600 nm to 2,000 nm (preferably ranging from 700 nm to 1,600 nm) in light of increasing the effect of the heat ray reflectance.

The visible light transmittance of the heat ray-shielding material of the present invention is preferably 60% or higher. When the visible light transmittance is lower than 60%, and when the heat-ray-shielding material is used, for example, as window glass for automobiles or for buildings, it may be difficult to view the outside.

The degree of haze of the heat ray-shielding material of the present invention is preferably 20% or lower. When the degree of haze is higher than 20%, and when the heat-ray-shielding material is used, for example, as window glass for automobiles or for buildings, it may be difficult to view the outside, and it may be unfavorable in terms of safety.

[Use Aspect of Heat Ray-Shielding Material]

The use aspect of the heat ray-shielding material of the present invention is not particularly limited, as long as it is used for selectively reflecting or absorbing heat ray (near-infrared ray), and may be suitably selected in accordance with the intended use. Examples of the use aspect include glass and films for vehicles, glass and films for building materials, and glass and films for agriculture. Among these, the heat ray-shielding material is preferably used for glass and films for vehicles and for buildings, from the viewpoint of energy saving.

Note that in the present invention, heat ray (near-infrared ray) means a near-infrared ray (with a wavelength of from 780 nm to 2,500 nm) contained about 50% of sunlight.

The method of producing the glass is not particularly limited and may be suitably selected in accordance with the intended use. On the heat ray-shielding material produced as above, an adhesive layer is further formed, and the heat ray-shielding material may be bonded to glass for vehicles such as automobiles or glass for buildings, or may be sandwiched in between intermediate films made of PVB or EVA for use in laminated glass. In addition, the heat ray-shielding material may be used after only particle/binder layer is transferred onto an intermediate film made of PVB or EVA, and the substrate is removed therefrom.

EXAMPLES

Hereinafter, the present invention will be further described with reference to specific Examples of the present invention, which however shall not be construed as limiting the scope of the present invention.

Example 1

Synthesis of Metallic Flat Particle

A 150 mM hydrazine aqueous solution (0.75 mL) was added, without stopping, into a solution containing the following components, and stirred at 25° C. and at 1,000 rpm for 2 hours to obtain a turbid blue particle-dispersion liquid.

ion-exchanged water . . . 762 g silver nitrate (produced by Wako Junyaku Co., Ltd.) . . . 12.7 mg sodium citrate trihydrate (produced by Wako Junyaku Co., Ltd.) 100.6 mg EDTA4 sodium acetate (produced by Wako Junyaku Co., Ltd.) . . . 5.0 mg It was confirmed that hexagonal-shaped flat particles made of silver having an average particle diameter (average circle-equivalent diameter) of 40 nm (hereinafter, referred to as "hexagonal shaped flat particles") were formed in the particle dispersion liquid. Also, the thickness of the hexagonal-shaped flat particles was measured by an atomic force microscope (NANOCUTE II, manufactured by SEIKO INSTRUMENTS INC.). As a result, it was found that the thickness was 5 nm, and flat particles having an aspect ratio of 8 were produced.

—Production of Metal Particle-Containing Layer—

A float glass of 1 mm in thickness, which had been cleaned with an UV ozone cleaner, was dipped in a 1% by mass aminopropyl triethoxysilane aqueous solution for 30 minutes, and then lightly washed with ion-exchanged water. Subsequently, the float glass was baked in an oven at 110° C. for 30 minutes to obtain a glass substrate on which surface an amino group was introduced. This glass substrate was dipped for 4 hours in the obtained Ag hexagonal-shaped flat particle-containing dispersion liquid to obtain a glass substrate on which surface Ag hexagonal-shaped flat particles were fixed (the number of particle-layer forming times: once).

On the surface of the obtained glass substrate, an Au—Pd thin film was vapor-deposited by an ion coater (ION COATER IB-5, manufactured by Eiko Engineering, Co. Ltd.) so as to have a thickness of 5 nm, and the surface of the glass substrate was observed by a SEM (manufactured by Hitachi Ltd., FE-SEM, S-4100, 5 kV, at a magnification of 10,000 times and 50,000 times). As a result, it was found that Ag hexagonal shaped flat particles were fixed on the surface of the glass substrate without causing aggregation, and the area ratio of the Ag hexagonal shaped flat particles included in the substrate surface measured as described below was 30%.

Thereafter, a 1% by mass polyvinylbutyral (PVB) (produced by Wako Junyaku Co., Ltd., average polymerization degree: 700) toluene-acetone (toluene:acetone=1:1 (mass ratio) solution was applied on the surface of the glass substrate with the Ag hexagonal shaped flat particles being fixed, using a wire bar No. 30 (manufactured by R. D. S Webster N.Y.) and dried to thereby form a protective layer having a thickness of 1 μm (1,000 nm). With the above procedure, a heat ray-shielding material of Example 1 was produced.

Next, the thus obtained metal particles and heat ray-shielding material were evaluated for their various properties in the following manner. The evaluation results are shown in Tables 2-1A to 2-3B.

<<Evaluation of Metal Particle>>

—Proportion of Flat Particles, Average Particle Diameter (Average Circle Equivalent Diameter), Coefficient Variation—

The Ag flat particles were subjected to an image analysis to evaluate the uniformity of shape thereof. More specifically, the Ag flat particles were photographed by a SEM, and 200 particles arbitrarily extracted from the obtained SEM image, under the definition that substantially hexagonal or substantially discoidal flat particles were defined as "A", and particles having indefinite shapes such as teardrop shape were defined as "B". Then, the proportion (% by number) of particles corresponding to "A" was determined.

Also, 100 particles corresponding to "A" were measured for their particle diameters with a digital vernier caliper, and the average value of the particle diameters was defined as an average particle diameter (average circle equivalent diameter). Then, the standard deviation of a particle size distribution was divided by the average particle diameter (average circle equivalent diameter) so as to determine a coefficient of variation (%) thereof.

—Average Particle Thickness—

A dispersion liquid containing the obtained metal flat particles was delivered by drops to a glass substrate, and the thickness of one metal flat particles was measured by an atomic force microscope (AFM) (NANOCUTE II, manufactured by SEIKO INSTRUMENTS INC.). The following conditions were employed for measurement using the AFM: self-detection type sensor, DFM mode; scope of measurement: 5 μm; scanning speed: 180 seconds/frame; and the number of data points: 256×256.

—Aspect Ratio—

Based on the obtained average particle diameter (average circle equivalent diameter) and average thickness of the metal flat particles, the average particle diameter (average circle equivalent diameter) was divided by the average particle thickness to calculate an aspect ratio.

—Randomness of Inter-Particle Distance—

In the obtained heat ray-shielding material, a two-dimensional autocorrelation was performed on the brightness value obtained by binarizing a SEM image in which 100 or more metallic flat particles are included, and the autocorrelation result was plotted. In the case of a curve having no significant local maximum point except for the origin point was evaluated as "having no peak", in other words "being random", and in the case of a curve having significant local maximum point(s) except for the origin point was evaluated as "having peaks", in other words, "being random".

—Average Inter-Particle Distance in Horizontal Direction/Average Particle Diameter (Average Circle Equivalent Diameter)—

Concerning the arbitrarily extracted 100 particles in the image obtained by observation of the resulting heat ray-shielding material through a scanning electron microscope (SEM), an average value of inter-particle distance of metallic flat particles present adjacent to each other in the horizontal direction was calculated, and the obtained value was determined as an average inter-particle distance in the horizontal direction. The thusly obtained average inter-particle distance was divided by the average particle diameter (average circle equivalent diameter) of the metallic flat particles as described above to obtain a value.

—Area Ratio—

The SEM image of the heat ray-shielding material obtained by observation through a scanning electron microscope (SEM) was binarized. An area ratio [(B/A)×100]], which is a ratio of a sum value of areas of the metallic flat particles relative to an area A of the substrate when the heat ray-shielding material was viewed from above (a total projected area A of the metal particle-containing layer when viewed from the perpendicular direction relative to the metal particle-containing layer), was determined.

—Tilt Angle of Particles—

In the case where the substrate was hard, like glass, after the substrate was scratched with a glass cutter from the rear surface thereof so as to be cut into a piece, a cross-section thereof cut in the perpendicular direction thereof, in the case where the substrate was soft, like a resin film, after the substrate was covered and embedded with an epoxy resin, the substrate was cut into a piece with a razor in a state of being frozen with a liquid nitrogen, thereby preparing a cross-sectional sample of the heat ray-shielding material which was cut in the perpendicular direction thereof. This perpendicular cross-section sample was observed by a scanning electron microscope (SEM), and for 100 metallic flat particles, a tilt angle with respect to the horizontal plane of the substrate (corresponding to ±θ in FIG. 3B) was calculated as an average value of tilt angle.

—Thickness of Particle-Containing Layer—

A perpendicular cross-section sample of the heat ray-shielding material, which was produced in the same manner as that obtained for the tilt angle of particles, was observed through a SEM, and the thickness of the metallic flat particle-containing layer was calculated.

—Inter-Particle Diameter of Adjacent Metal Particle-Containing Layers in Case of a Plurality of Metal Particle-Containing Layers being Laminated—

The distance between adjacent metal particle-containing layers was calculated from an image of the perpendicular cross-section sample of the heat ray-shielding material observed through a SEM.

—Method for Confirming Whether or not Metal Particle-Containing Layer is Present in a Range of (λ/n)/4 in a Depth Direction of Heat Ray-Shielding Material from the Horizontal Plane—

Whether or not the metal particle-containing layer is present in a range of (λ/n)/4 in a depth direction of heat ray-shielding material from the horizontal plane thereof was calculated from the image of the perpendicular cross-section sample of the heat-ray shielding material obtained by observation through a SEM.

<<Evaluation of Heat Ray-Shielding Material>>

—Visible Light Transmission Spectrum and Heat Ray Reflection Spectrum—

A visible light transmission spectrum and a heat ray reflection spectrum of the obtained heat ray-shielding material were evaluated according to the method described in JIS, which is the evaluation standard of glass for automobiles.

The transmission and reflection spectra of the heat ray-shielding material were evaluated using an ultraviolet visible and near infrared spectrometer (manufactured by JASCO Corporation, V-670). In the evaluation, an absolute reflectance measurement unit (ARV-474, manufactured by JASCO Corporation) was used. As for an incident light beam, a light beam was transmitted to a 45° polarizing plate, which was regarded as a non-polarized light beam, and used as an incident light beam.

—Maximum Heat Ray Reflectance/Visible Light Transmittance—

The maximum heat ray reflectance was measured and calculated by the method described in "Test Methods of Transmittance/Reflectance/Emissivity/Solar Radiation Yield Rate of Plate Glasses" of JIS-R3106:1998. After a maximum heat ray reflectance was measured at a wavelength from 300 nm to 2,100 nm, a value of reflectance at each wavelength was corrected depending on a spectrum intensity of direct solar radiation obtained at each wavelength, and the value was regarded as the maximum heat ray reflectance.

As to the visible light transmittance, after a transmittance was measured at a wavelength from 380 nm to 780 nm, a value of transmittance at each wavelength was corrected depending on a spectral luminous sensitivity obtained at each wavelength, and the value was regarded as the visible light transmittance.

—Radio Wave Transmission—

Using a surface resistance measurement device (ROR-ESTER, manufactured by Mitsubishi Chemical Corporation), the surface resistance (Ω/square) of the heat ray-shielding material obtained as above was measured, and the resulting value was regarded as a radio wave transmission.

As a result of evaluation of each of the heat ray-shielding material, it had a visible light transmittance of 88%, a maximum reflectance wavelength of 800 nm, and a maximum reflectance of 21%.

Further, to evaluate the radio wave transmission of the substrate, the surface resistance of the substrate was measured. As a result, it was confirmed that the surface resistance was $9.9 \times 10^{12}$ Ω/square, and the substrate had a radio wave transmissivity.

—Measurement of Haze—

The heat ray-shielding material obtained as described above was measured for its haze (%) using a haze meter (NDH-5000, manufactured by Nippon Denshoku Industries Co., Ltd.). As a result of evaluation, the heat ray-shielding material was found to have a haze value of 2.5%.

Examples 2 to 24 and Comparative Example 4

Metallic flat particles of Examples 2 to 24 and Comparative Example 4 and heat ray-shielding materials of Examples 2 to 24 and Comparative Example 4 were produced in the same manner as in Example 1, except that the conditions for producing metal flat particles were changed to those shown in Tables 1-A and 1-B.

Figure 5A:
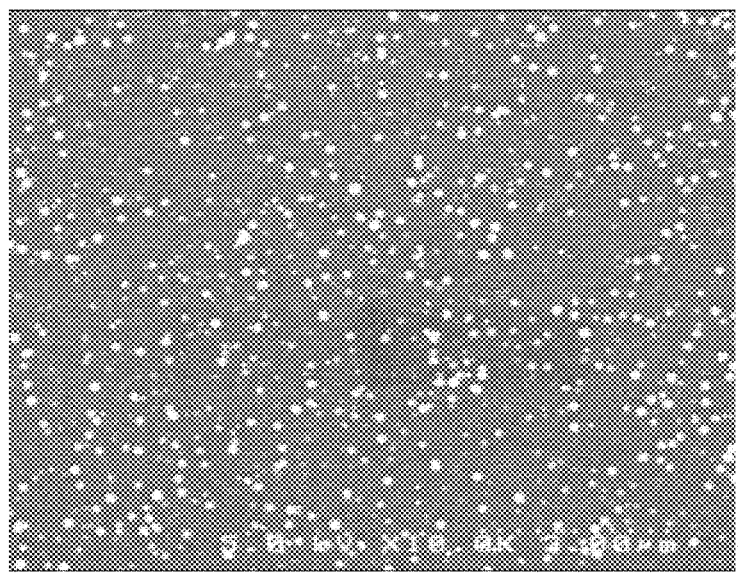
FIG. 5A is a SEM image of a heat ray-shielding material obtained in Example 23 (observed at a magnification of 10,000 times).
Figure 5B:
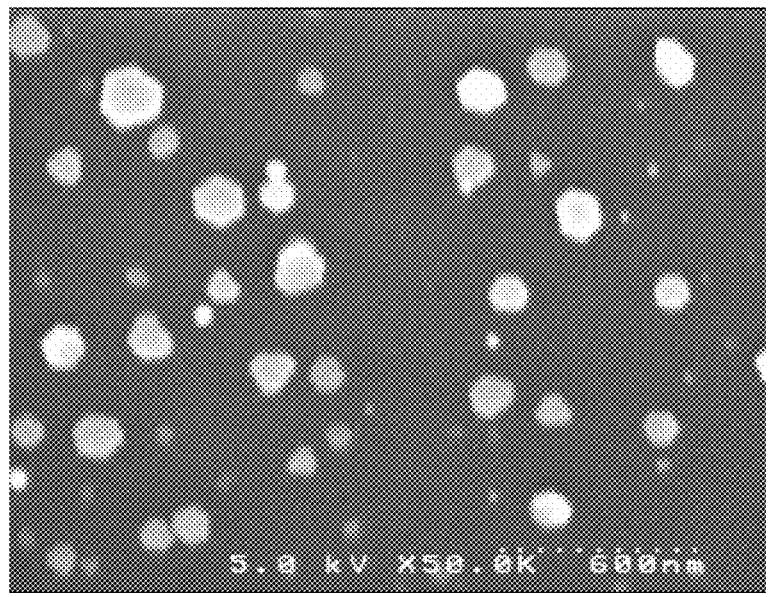
FIG. 5B is a SEM image of the heat ray-shielding material obtained in Example 23 (observed at a magnification of 50,000 times).

Note that a SEM image of the heat ray-shielding material obtained in Example 23, which was observed at a magnification of 10,000 times is illustrated in FIG. 5A; and a SEM image of the heat ray-shielding material obtained in Example 23, which was observed at a magnification of 50,000 times is illustrated in FIG. 5B.

Example 25

A heat ray-shielding material was produced in the same manner as in Example 5, except that after Ag flat particles were synthesized as shown in Table 1-B, when producing a substrate for heat ray-reflecting material, an Ag flat particle-dispersion liquid was delivered by drops to a surface of the substrate, and then dried in an oven at 100° C. for 30 minutes, without the substrate being dipped in the Ag flat particle-dispersion liquid.

Example 26

A heat ray-shielding material was produced in the same manner as in Example 5, except that after Ag flat particles were synthesized as shown in Table 1-B, when producing a substrate for heat ray-reflecting material, an Ag flat particle-dispersion liquid was delivered by drops to a surface of the substrate, and then dried in an oven at 50° C. for 30 minutes, without the substrate being dipped in the Ag flat particle-dispersion liquid.

Example 27

In Example 5, an Ag hexagonal flat particle-fixed glass substrate was synthesized as shown in Table 1-B, and then when a heat ray-reflecting material was produced, a 10% by mass PVB toluene-acetone solution was applied thereto with a wire bar No. 24, instead of applying a 1% by mass PVB toluene-acetone solution with a wire bar No. 30, and dried to form an intermediate layer having a thickness of 8 µm, thereby producing an intermediate layer-attached substrate. Then, the intermediate layer-attached substrate was dipped in the Ag hexagonal flat particle-dispersion liquid for 4 hours to obtain a glass substrate on which surface Ag hexagonal flat particles were fixed (formation of particle-layer at the second time). Subsequently, on a surface of the glass substrate on which two layers of Ag hexagonal flat particle layer were fixed, a 1% by mass polyvinylbutyral (PVB) (produced by Wako Junyaku Co., Ltd., average polymerization degree: 700) toluene-acetone (toluene:acetone=1:1 (mass ratio) solution was applied, using a wire bar No. 30 and dried to provide a protective layer having a thickness of 1 µm (1,000 nm). With the above manner, a heat ray-shielding material of Example 27 was produced.

Example 28

A heat ray-shielding material was produced in the same manner as in Example 27, except that in the coating of an intermediate layer coating liquid, a wire bar No. 30 (manufactured by R. D. S Webster N.Y.) was used to provide an intermediate layer having a thickness of 10 µm, instead of using the wire bar No. 24.

Example 29

A heat ray-shielding material was produced in the same manner as in Example 27, except that in the coating of an intermediate layer coating liquid, a wire bar No. 46 (manufactured by R. D. S Webster N.Y.) was used to provide an intermediate layer having a thickness of 15 µm, instead of using the wire bar No. 24.

Example 30

A heat ray-shielding material was produced in the same manner as in Example 27, except that in the coating of an intermediate layer coating liquid, a wire bar No. 60 (manufactured by R. D. S Webster N.Y.) was used to provide an intermediate layer having a thickness of 20 µm, instead of using the wire bar No. 24.

Example 31

A heat ray-shielding material was produced in the same manner as in Example 5, except that Ag flat particles were synthesized as described in Table 1-B and then subjected to an aging treatment as described below, and the shape of the Ag flat particles was changed from a hexagonal shape to a substantially disc shape.

—Aging Treatment—

A diluted nitric acid was added to a dispersion liquid of the Ag flat particles, and then the dispersion liquid was heated at 80° C. for 1 hour, thereby performing the aging treatment. The particles that had been subjected to the aging treatment was observed by a TEM. As a result, it was confirmed that angles of the hexagonal shape became obtuse, and the shape thereof was changed into a substantially disc shape.

Example 32

A heat ray-shielding material was produced in the same manner as in Example 31, except that after Ag flat particles were synthesized, $TiO_2$ shell was formed as described below.
—Formation of $TiO_2$ Shell—
Formation of $TiO_2$ shell was carried out with reference to the document (authored by Langmuir, (2000) pp. 2731-2735, Vol. 16). Tetraethoxytitanium (2 mL), acetylacetone (2.5 mL), and dimethylamine (0.1 mL) were added to the Ag flat particle dispersion liquid and stirred for 5 hours to thereby obtain Ag flat particles coated with a $TiO_2$ shell.

Example 33

A heat ray-shielding material was produced in the same manner as in Example 1, except that a mixed-particle-dispersion liquid prepared by mixing the Age flat particle dispersion liquid produced in Example 14 with the Ag flat particle dispersion liquid produced in Example 12 in equal proportions.

Example 34

A heat ray-shielding material was produced in the same manner as in Example 1, except that a mixed-particle-dispersion liquid prepared by mixing the Age flat particle dispersion liquid produced in Example 14 with the Ag flat particle dispersion liquid produced in Example 7 in equal proportions.

Example 35

Synthesis of Metallic Flat Particles

A 0.5 g/L polystyrene sulfonate aqueous solution (2.5 mL) was added to a sodium citrate aqueous solution of 2.5 mM (50 mL) and heated to 35° C. Then, a 10 mM sodium boron hydride aqueous solution (3 mL) was added to this solution, and a 0.5 mM silver nitrate aqueous solution (50 mL) was further added while being stirred at 20 mL/min. This solution was stirred for 30 minutes to prepare a seed solution.

Ion exchanged water (87.1 mL) was added in a sodium citrate aqueous solution of 2.5 mM (132.7 mL) in a reaction heater and heated to 35° C. A 10 mM ascorbic acid aqueous solution (2 mL) was added into the solution in the reaction heater, the seed solution (42.4 mL) was added thereto, and then a silver nitrate aqueous solution of 0.5 mM (79.6 mL) was further added thereto while being stirred at 10 mL/min. After the resulting solution was stirred for 30 minutes, a 0.35 M hydroquinone potassium sulfonate aqueous solution (71.1 mL) was added into the reaction heater, and a 7% by mass gelatin aqueous solution (200 g) was added thereto. A mixture liquid of white sediment silver sulfite, which was prepared by mixing a 0.25M sodium sulfite aqueous solution (107 mL) with a 0.47M silver nitrate aqueous solution (107 mL), was added to the solution in the reaction heater. Upon addition of the mixture liquid of white sediment into the reaction heater, a 0.17M NaOH aqueous solution (72 mL) was added thereinto. The NaOH aqueous solution was added while controlling the addition speed so that the pH of the solution was not exceeding 10. This solution was stirred for 300 minutes to obtain a silver flat particle dispersion liquid.

It was confirmed that silver-hexagonal shape particles (hereinbelow, referred to as "Ag hexagonal flat particles") having an average circle equivalent diameter of 230 nm had been produced. Also, thicknesses of the hexagonal flat particles were measured by an atomic force microscope (NANOCUTE II, manufactured by SEIKO INSTRUMENTS INC.), and it was found that flat particles having an average thickness of 16 nm and an aspect ratio of 14.3 were produced.
—Production of Metal Particle-Containing Layer—
A 1N NaOH (0.75 mL) was added to the silver flat particle dispersion liquid (16 mL) and then ion exchanged water (24 mL) was added thereto, followed by centrifugal separation treatment using a centrifugal separator (manufactured by Kokusan Co. Ltd., H-200N, ANGLE ROATOR BN) at 5,000 rpm for 5 minutes, so as to precipitate the Ag hexagonal flat particles. After a supernatant fluid after the centrifugal separation was removed therefrom, water (5 mL) was added thereto, and precipitated Ag hexagonal flat particles were re-dispersed. A 2% by mass water methanol solution represented by the following structural formula W-1 (water:methanol=1:1 (mass ratio)) (1.6 mL) was added to this dispersion liquid to prepare a coating liquid. This coating liquid was applied onto a PET film using a wire bar No. 14 (manufactured by R. D. S Webster N.Y.), and dried to obtain a film on which surface the Ag hexagonal flat particles were fixed.

Figure 6:
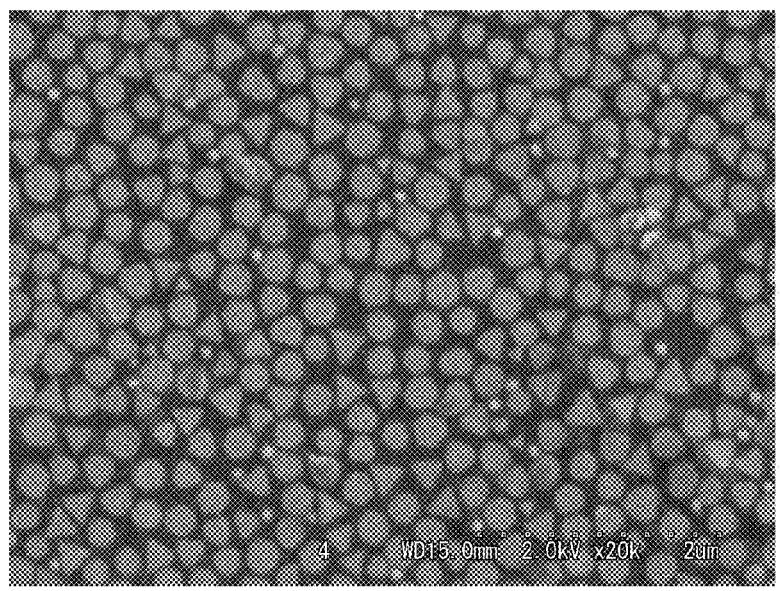
FIG. 6 is a SEM image of a heat ray-shielding material obtained in Example 35 (observed at a magnification of 20,000 times).

After a carbon thin film was vapor deposited on the obtained PET film so as to have a thickness of 20 nm, the film was observed by a SEM (manufactured by Hitachi Ltd., FE-SEM, S-4300, 2 kV, at a magnification of 20,000 times). The result is illustrated in FIG. 6. It was found that Ag hexagonal flat particles were fixed on the PET film without aggregation, and an area ratio of the Ag hexagonal flat particles, measured as described above, to the surface of the substrate was 45%. With the above-described procedure, a heat ray-shielding material of Example 35 was produced.

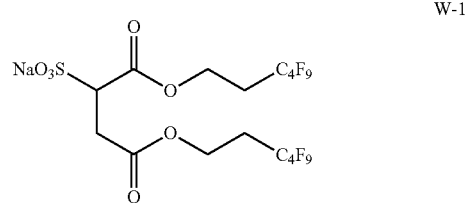

W-1

Example 36

A heat ray-shielding material was produced in the same manner as in Example 35, except that instead of adding the 0.17M NaOH aqueous solution (72 mL), a 0.83M NaOH aqueous solution (72 mL) was added to the Ag flat particle dispersion liquid.

Example 37

A heat ray-shielding material was produced in the same manner as in Example 35, except that instead of adding the 0.17M NaOH aqueous solution (72 mL), a 0.08M NaOH aqueous solution (72 mL) was added to the Ag flat particle dispersion liquid.

Example 38

A heat ray-shielding material was produced in the same manner as in Example 35, except that the 0.17M NaOH aqueous solution (72 mL) was not added to the Ag flat particle dispersion liquid.

Example 39

A heat ray-shielding material was produced in the same manner as in Example 35, except that ion-exchanged water (87.1 mL) was not added and the amount of the seed solution was changed to 127.6 mL.

Example 40

A heat ray-shielding material was produced in the same manner as in Example 39, except that instead of adding the 0.17M NaOH aqueous solution (72 mL), a 0.08M NaOH aqueous solution (72 mL) was added to the Ag flat particle dispersion liquid.

Example 41

A heat ray-shielding material was produced in the same manner as in Example 39, except that the 0.17M NaOH aqueous solution (72 mL) was not added to the Ag flat particle dispersion liquid.

Example 42

A heat ray-shielding material was produced in the same manner as in Example 40, except that the 2.5 mM sodium citrate aqueous solution (132.7 mL) was not added and the amount of the seed solution was changed to 255.2 mL.

Example 43

A heat ray-shielding material was produced in the same manner as in Example 42, except that the 0.08M NaOH aqueous solution of (72 mL) was not added to the Ag flat particle dispersion liquid.

Example 44

A heat ray-shielding material was produced in the same manner as in Example 35, except that the amount of the seed solution added was changed to 21.2 mL.

Example 45

A heat ray-shielding material was produced in the same manner as in Example 44, except that instead of adding the 0.17M NaOH aqueous solution (72 mL), a 0.83M NaOH aqueous solution (72 mL) was added to the Ag flat particle dispersion liquid.

Example 46

A heat ray-shielding material was produced in the same manner as in Example 35, except that in the preparation of the coating liquid, a 2% by mass of the above-described water-methanol solution of W-1 (water:methanol=1:1 (mass ratio) was added in an amount of 1.6 mL into the Ag flat particle dispersion liquid (6 mL) to thereby prepare a coating solution.

Comparative Example 1

Ag-spherical shape particles and a heat ray-shielding material were produced in the same manner as in Example 1, except that when Ag flat particles were formed as described in Table 1-B, EDTA4 sodium acetate was not added.

Comparative Example 2

A heat ray-shielding material were produced in the same manner as in Example 1, except that a mixed-particle-dispersion liquid prepared by mixing the Age flat particle dispersion liquid produced in Example 5 with the Ag-spherical shape particle dispersion liquid produced in Comparative Example 1 in equal proportions.

Comparative Example 3

According to the description of Example 1 in Japanese Patent (JP-B) No. 3454422, a recreation test was carried out as follows.

Over the surface of a glass substrate having a thickness of 1 mm, an AlN layer, an Ag layer, an AlN layer were laminated in this order by a sputtering method. For the AlN layer (undermost layer) was deposited by DC reactive sputtering using $N_2$ as a reactive gas. Next, in a vacuum, the Ag layer was deposited on the surface of the AlN layer-attached glass substrate using an Ag target, in the condition where the substrate was heated at 250° C., and then an Ag layer was formed on which surface granular Ag was produced. Further, the AlN layer was formed using an Al target and $N_2$ gas.

TABLE 1-A

| | Amount of EDTA (mg) | Amount of hydrazine (mL) | Time of dipping substrate (hour) | Type of binder for use in protective layer | Solvent (volume ratio) | Thickness of protective layer (μm) | Number of times for forming protective layer |
|---|---|---|---|---|---|---|---|
| Ex. 1 | 5.0 | 0.75 | 4 | PVB | toluene/acetone = 1/1 | 1 | 1 |
| Ex. 2 | 10.0 | 0.75 | 4 | PVB | toluene/acetone = 1/1 | 1 | 1 |
| Ex. 3 | 15.0 | 0.75 | 4 | PVB | toluene/acetone = 1/1 | 1 | 1 |
| Ex. 4 | 17.5 | 0.75 | 4 | PVB | toluene/acetone = 1/1 | 1 | 1 |
| Ex. 5 | 19.5 | 0.75 | 4 | PVB | toluene/acetone = 1/1 | 1 | 1 |
| Ex. 6 | 22.5 | 0.75 | 4 | PVB | toluene/acetone = 1/1 | 1 | 1 |
| Ex. 7 | 30.0 | 0.75 | 4 | PVB | toluene/acetone = 1/1 | 1 | 1 |
| Ex. 8 | 40.0 | 0.75 | 4 | PVB | toluene/acetone = 1/1 | 1 | 1 |
| Ex. 9 | 19.5 | 0.5 | 4 | PVB | toluene/acetone = 1/1 | 1 | 1 |
| Ex. 10 | 17.5 | 0.75 | 4 | PVB | toluene/acetone = 1/1 | 1 | 1 |
| Ex. 11 | 22.5 | 0.85 | 4 | PVB | toluene/acetone = 1/1 | 1 | 1 |
| Ex. 12 | 25.0 | 1.00 | 4 | PVB | toluene/acetone = 1/1 | 1 | 1 |
| Ex. 13 | 40.0 | 0.75 | 4 | PVB | toluene/acetone = 1/1 | 1 | 1 |

TABLE 1-A-continued

|  | Amount of EDTA (mg) | Amount of hydrazine (mL) | Time of dipping substrate (hour) | Type of binder for use in protective layer | Solvent (volume ratio) | Thickness of protective layer (μm) | Number of times for forming protective layer |
|---|---|---|---|---|---|---|---|
| Ex. 14 | 19.5 | 0.75 | 4 | PVB | toluene/acetone = 1/1 | 1 | 1 |
| Ex. 15 | 19.5 | 0.75 | 4 | PVA | water/ethanol = 1/0.2 | 1 | 1 |
| Ex. 16 | 19.5 | 0.75 | 4 | PVA | water/ethanol = 1/0.1 | 1 | 1 |
| Ex. 17 | 19.5 | 0.75 | 4 | PVA | water/ethanol = 1/0.05 | 1 | 1 |
| Ex. 18 | 19.5 | 0.75 | 4 | PVB | toluene/acetone = 1/1 | 1 | 1 |
| Ex. 19 | 19.5 | 0.75 | 4 | PVA | water/ethanol = 1/0.25 | 0.5 | 1 |
| Ex. 20 | 19.5 | 0.75 | 4 | PVA | water/ethanol = 1/0.25 | 1 | 1 |

TABLE 1-B

|  | Amount of EDTA (mg) | Amount of hydrazine (mL) | Time of dipping substrate (hour) | Type of binder for use in protective layer | Solvent (volume ratio) | Thickness of protective layer (μm) | Number of times for forming protective layer |
|---|---|---|---|---|---|---|---|
| Ex. 21 | 19.5 | 0.75 | 0.5 | PVB | toluene/acetone = 1/1 | 1 | 1 |
| Ex. 22 | 19.5 | 0.75 | 1 | PVB | toluene/acetone = 1/1 | 1 | 1 |
| Ex. 23 | 19.5 | 0.75 | 2 | PVB | toluene/acetone = 1/1 | 1 | 1 |
| Ex. 24 | 19.5 | 0.75 | 4 | PVB | toluene/acetone = 1/1 | 1 | 1 |
| Ex. 25 | 19.5 | 0.75 | — | PVB | toluene/acetone = 1/1 | 1 | 1 |
| Ex. 26 | 19.5 | 0.75 | — | PVB | toluene/acetone = 1/1 | 1 | 1 |
| Ex. 27 | 19.5 | 0.75 | 4 | PVB | toluene/acetone = 1/1 | 1 | 2 |
| Ex. 28 | 19.5 | 0.75 | 4 | PVB | toluene/acetone = 1/1 | 1 | 2 |
| Ex. 29 | 19.5 | 0.75 | 4 | PVB | toluene/acetone = 1/1 | 1 | 2 |
| Ex. 30 | 19.5 | 0.75 | 4 | PVB | toluene/acetone = 1/1 | 1 | 2 |
| Ex. 31 | 19.5 | 0.75 | 4 | PVB | toluene/acetone = 1/1 | 1 | 1 |
| Ex. 32 | 19.5 | 0.75 | 4 | PVB | toluene/acetone = 1/1 | 1 | 1 |
| Ex. 33 | Particle of Example 14 + Particle of Example 12 | | | | | | |
| Ex. 34 | Particle of Example 14 + Particle of Example 7 | | | | | | |
| Comp. Ex. 1 | 0 | 0.75 | 4 | PVB | toluene/acetone = 1/1 | 1 | 1 |
| Comp. Ex. 2 | Particle of Example 5 + Particle of Comp. Ex. 1 | | | | | | |
| Comp. Ex. 3 | Example 1 of (produced by Central Glass Co., Ltd.) disclosed in JP-B No. 3454422 was re-created for further testing | | | | | | |
| Comp. Ex. 4 | 19.5 | 0.75 | 4 | PVA | water/ethanol = 1/0 | 1 | 1 |

\* PVB (Polyvinylbutyral, produced by Wako Junyaku Co., Ltd.), average polymerization degree: 700)
\* PVA (Polyvinyl alcohol, produced by KURARAY Co., Ltd., PVA124, average polymerization degree: 2400)

40

Next, the metal particles and heat ray-shielding material of Examples 2 to 34 and Comparative Examples 1 to 4 were evaluated for their various properties in the same manner as in Example 1. The evaluation results are shown in Tables 2-1A to 2-3B.

TABLE 2-1-A

|  | Shape of particle | Rate of flat particles (% by number) | Average particle diameter (nm) | Average particle thickness (nm) | Aspect ratio | Coefficient of variation of particle size distribution | Randomness of inter-particle distance | Average inter-particle distance/ Average particle diameter |
|---|---|---|---|---|---|---|---|---|
| Ex. 1 | Substantially hexagonal | 83 | 40 | 5 | 8 | 10% | having no peak | — |
| Ex. 2 | Substantially hexagonal | 85 | 80 | 10 | 8 | 10% | having no peak | — |
| Ex. 3 | Substantially hexagonal | 86 | 120 | 15 | 8 | 10% | having no peak | — |
| Ex. 4 | Substantially hexagonal | 81 | 160 | 20 | 8 | 12% | having no peak | — |
| Ex. 5 | Substantially hexagonal | 85 | 200 | 25 | 8 | 10% | having no peak | — |
| Ex. 6 | Substantially hexagonal | 83 | 240 | 30 | 8 | 10% | having no peak | — |
| Ex. 7 | Substantially hexagonal | 65 | 400 | 20 | 20 | 25% | having no peak | — |
| Ex. 8 | Substantially hexagonal | 61 | 500 | 20 | 25 | 25% | having no peak | — |
| Ex. 9 | Substantially hexagonal | 85 | 80 | 20 | 4 | 10% | having no peak | — |
| Ex. 10 | Substantially hexagonal | 81 | 160 | 20 | 8 | 10% | having no peak | — |
| Ex. 11 | Substantially hexagonal | 83 | 240 | 20 | 12 | 10% | having no peak | — |
| Ex. 12 | Substantially hexagonal | 79 | 280 | 20 | 14 | 10% | having no peak | — |
| Ex. 13 | Substantially hexagonal | 60 | 600 | 20 | 30 | 30% | having no peak | — |
| Ex. 14 | Substantially hexagonal | 85 | 200 | 30 | 7 | 10% | having no peak | — |
| Ex. 15 | Substantially hexagonal | 85 | 200 | 30 | 7 | 10% | having no peak | — |

TABLE 2-1-A-continued

|  | Shape of particle | Rate of flat particles (% by number) | Average particle diameter (nm) | Average particle thickness (nm) | Aspect ratio | Coefficient of variation of particle size distribution | Randomness of inter-particle distance | Average inter-particle distance/ Average particle diameter |
|---|---|---|---|---|---|---|---|---|
| Ex. 16 | Substantially hexagonal | 85 | 200 | 30 | 7 | 10% | having no peak | — |
| Ex. 17 | Substantially hexagonal | 85 | 200 | 30 | 7 | 10% | having no peak | — |
| Ex. 18 | Substantially hexagonal | 85 | 200 | 30 | 7 | 10% | having no peak | — |
| Ex. 19 | Substantially hexagonal | 85 | 200 | 30 | 7 | 10% | having no peak | — |
| Ex. 20 | Substantially hexagonal | 85 | 200 | 30 | 7 | 10% | having no peak | — |

TABLE 2-1-B

|  | Shape of particle | Rate of flat particles (% by number) | Average particle diameter (nm) | Average particle thickness (nm) | Aspect ratio | Coefficient of variation of particle size distribution | Randomness of inter-particle distance | Average inter-particle distance/ Average particle diameter |
|---|---|---|---|---|---|---|---|---|
| Ex. 21 | Substantially hexagonal | 81 | 200 | 20 | 10 | 10% | having no peak | — |
| Ex. 22 | Substantially hexagonal | 81 | 200 | 20 | 10 | 10% | having no peak | — |
| Ex. 23 | Substantially hexagonal | 81 | 200 | 20 | 10 | 10% | having no peak | — |
| Ex. 24 | Substantially hexagonal | 81 | 200 | 20 | 10 | 10% | having no peak | — |
| Ex. 25 | Substantially hexagonal | 85 | 200 | 30 | 7 | 10% | having peaks | 0.05 |
| Ex. 26 | Substantially hexagonal | 85 | 200 | 30 | 7 | 10% | having peaks | 0.3 |
| Ex. 27 | Substantially hexagonal | 85 | 200 | 30 | 7 | 10% | having no peak | — |
| Ex. 28 | Substantially hexagonal | 85 | 200 | 30 | 7 | 10% | having no peak | — |
| Ex. 29 | Substantially hexagonal | 85 | 200 | 30 | 7 | 10% | having no peak | — |
| Ex. 30 | Substantially hexagonal | 85 | 200 | 30 | 7 | 10% | having no peak | — |
| Ex. 31 | Discoidal shape | 85 | 190 | 30 | 7 | 10% | having no peak | — |
| Ex. 32 | Discoidal shape/with shell | 85 | 200 | 30 | 7 | 10% | having no peak | — |
| Ex. 33 | Substantially hexagonal | 82 | 200 | 30 | 7 | 10% | having no peak | — |
|  |  |  | 280 | 20 | 14 | 10% |  |  |
| Ex. 34 | Substantially hexagonal | 82 | 200 | 30 | 7 | 10% | having no peak | — |
|  |  |  | 400 | 20 | 20 | 25% |  |  |
| Comp. Ex. 1 | Spherical shape | — | 30 | 30 | 1 | 10% | having no peak | — |
| Comp. Ex. 2 | Spherical shape + Substantially hexagonal | 42 | 30 | 30 | 7 | 10% | having no peak | — |
|  |  |  | 200 | 25 | 8 | 10% | having no peak | — |
| Comp. Ex. 3 | Indefinite/Dome shape | 30 | 230 | 26 | 9 | 45% | having no peak | — |
| Comp. Ex. 4 | Substantially hexagonal | 85 | 200 | 30 | 7 | 10% | having no peak | — |

TABLE 2-2-A

|  | Area ratio (%) | Thickness of shell (nm) | Tilt angle of particle (°) (Plane orientation) | Thickness of particle-containing layer (μm) | The number of particle layers | Inter-particle distance (μm) between adjacent metal particle-containing layers | Range of region where metal particle-containing layer is present < (λ/n)/4 |
|---|---|---|---|---|---|---|---|
| Ex. 1 | 30 | — | ±2° | 0.1 | 1 | — | A |
| Ex. 2 | 30 | — | ±2° | 0.1 | 1 | — | A |
| Ex. 3 | 30 | — | ±2° | 0.1 | 1 | — | A |
| Ex. 4 | 30 | — | ±2° | 0.1 | 1 | — | A |
| Ex. 5 | 30 | — | ±2° | 0.1 | 1 | — | A |
| Ex. 6 | 30 | — | ±2° | 0.1 | 1 | — | A |
| Ex. 7 | 30 | — | ±2° | 0.1 | 1 | — | A |
| Ex. 8 | 30 | — | ±2° | 0.1 | 1 | — | A |
| Ex. 9 | 30 | — | ±2° | 0.1 | 1 | — | A |
| Ex. 10 | 30 | — | ±2° | 0.1 | 1 | — | A |
| Ex. 11 | 30 | — | ±2° | 0.1 | 1 | — | A |
| Ex. 12 | 30 | — | ±2° | 0.1 | 1 | — | A |
| Ex. 13 | 30 | — | ±2° | 0.1 | 1 | — | A |
| Ex. 14 | 30 | — | ±2° | 0.1 | 1 | — | A |
| Ex. 15 | 30 | — | ±10° | 0.1 | 1 | — | A |
| Ex. 16 | 30 | — | ±20° | 0.1 | 1 | — | A |
| Ex. 17 | 30 | — | ±30° | 0.1 | 1 | — | A |
| Ex. 18 | 30 | — | ±2° | 0.1 | 1 | — | A |

TABLE 2-2-A-continued

| | Area ratio (%) | Thickness of shell (nm) | Tilt angle of particle (°) (Plane orientation) | Thickness of particle-containing layer (μm) | The number of particle layers | Inter-particle distance (μm) between adjacent metal particle-containing layers | Range of region where metal particle-containing layer is present < (λ/n)/4 |
|---|---|---|---|---|---|---|---|
| Ex. 19 | 30 | — | ±2° | 0.2 | 1 | — | A |
| Ex. 20 | 30 | — | ±2° | 0.5 | 1 | — | A |

TABLE 2-2-B

| | Area ratio (%) | Thickness of shell (nm) | Tilt angle of particle (°) (Plane orientation) | Thickness of particle-containing layer (μm) | The number of particle layers | Inter-particle distance (μm) between adjacent metal particle-containing layers | Range of region where metal particle-containing layer is present < (λ/n)/4 |
|---|---|---|---|---|---|---|---|
| Ex. 21 | 5 | — | ±2° | 0.1 | 1 | — | A |
| Ex. 22 | 15 | — | ±2° | 0.1 | 1 | — | A |
| Ex. 23 | 20 | — | ±2° | 0.1 | 1 | — | A |
| Ex. 24 | 30 | — | ±2° | 0.1 | 1 | — | A |
| Ex. 25 | 30 | — | ±2° | 0.1 | 1 | — | A |
| Ex. 26 | 30 | — | ±2° | 0.1 | 1 | — | A |
| Ex. 27 | 30 | — | ±2° | 0.1 | 2 | 8 | A |
| Ex. 28 | 30 | — | ±2° | 0.1 | 2 | 10 | A |
| Ex. 29 | 30 | — | ±2° | 0.1 | 2 | 15 | A |
| Ex. 30 | 30 | — | ±2° | 0.1 | 2 | 20 | A |
| Ex. 31 | 27 | — | ±2° | 0.1 | 2 | — | A |
| Ex. 32 | 51 | 30 | ±2° | 0.1 | 1 | — | A |
| Ex. 33 | 30 | — | ±2° | 0.1 | 1 | — | A |
| Ex. 34 | 30 | — | ±2° | 0.1 | 1 | — | A |
| Comp. Ex. 1 | 30 | — | ±2° | 0.1 | 1 | — | A |
| Comp. Ex. 2 | 30 | — | ±2° | 0.1 | 1 | — | A |
| Comp. Ex. 3 | 65 | — | ±2° | 0.2 | 1 | — | A |
| Comp. Ex. 4 | 30 | — | ±40° | 0.1 | 1 | — | B |

TABLE 2-3-A

| | Visible light transmittance (%) | Haze (500 nm) (%) | Wavelength (nm) of maximum reflectance | Maximum reflectance (%) | Surface resistance value (Ω/square) (radio wave transmissivity) |
|---|---|---|---|---|---|
| Ex. 1 | 88 | — | 800 | 21 | $9.9 \times 10^{12}$ (provided) |
| Ex. 2 | 86 | — | 800 | 50 | $9.9 \times 10^{12}$ (provided) |
| Ex. 3 | 83 | — | 800 | 61 | $9.9 \times 10^{12}$ (provided) |
| Ex. 4 | 81 | 1.9 | 805 | 70 | $9.9 \times 10^{12}$ (provided) |
| Ex. 5 | 78 | — | 900 | 78 | $9.9 \times 10^{12}$ (provided) |
| Ex. 6 | 75 | — | 980 | 79 | $9.9 \times 10^{12}$ (provided) |
| Ex. 7 | 71 | 9.2 | 1,600 | 72 | $9.9 \times 10^{12}$ (provided) |
| Ex. 8 | 68 | 9.8 | 1,800 | 62 | $9.9 \times 10^{12}$ (provided) |
| Ex. 9 | 87 | — | 700 | 43 | $9.9 \times 10^{12}$ (provided) |
| Ex. 10 | 81 | — | 900 | 68 | $9.9 \times 10^{12}$ (provided) |
| Ex. 11 | 80 | — | 1,100 | 72 | $9.9 \times 10^{12}$ (provided) |
| Ex. 12 | 69 | — | 1,200 | 73 | $9.9 \times 10^{12}$ (provided) |
| Ex. 13 | 64 | — | 2,000 | 58 | $9.9 \times 10^{12}$ (provided) |
| Ex. 14 | 80 | — | 900 | 77 | $9.9 \times 10^{12}$ (provided) |
| Ex. 15 | 80 | — | 900 | 74 | $9.9 \times 10^{12}$ (provided) |
| Ex. 16 | 78 | — | 900 | 73 | $9.9 \times 10^{12}$ (provided) |
| Ex. 17 | 77 | — | 900 | 71 | $9.9 \times 10^{12}$ (provided) |
| Ex. 18 | 73 | — | 900 | 72 | $9.9 \times 10^{12}$ (provided) |
| Ex. 19 | 68 | — | 900 | 60 | $9.9 \times 10^{12}$ (provided) |
| Ex. 20 | 62 | — | 900 | 50 | $9.9 \times 10^{12}$ (provided) |

TABLE 2-3-B

| | Visible light transmittance (%) | Haze (500 nm) (%) | Wavelength (nm) of maximum reflectance | Maximum reflectance (%) | Surface resistance value (Ω/square) (radio wave transmissivity) |
|---|---|---|---|---|---|
| Ex. 21 | 88 | — | 1,000 | 16 | $9.9 \times 10^{12}$(provided) |
| Ex. 22 | 84 | — | 1,000 | 51 | $9.9 \times 10^{12}$(provided) |
| Ex. 23 | 81 | — | 1,000 | 60 | $9.9 \times 10^{12}$(provided) |
| Ex. 24 | 79 | — | 1,000 | 69 | $9.9 \times 10^{12}$(provided) |
| Ex. 25 | 66 | — | 900 | 62 | $9.9 \times 10^{12}$(provided) |
| Ex. 26 | 72 | — | 900 | 73 | $9.9 \times 10^{12}$(provided) |
| Ex. 27 | 65 | — | 900 | 72 | $9.9 \times 10^{12}$(provided) |
| Ex. 28 | 68 | — | 900 | 71 | $9.9 \times 10^{12}$(provided) |
| Ex. 29 | 70 | — | 900 | 73 | $9.9 \times 10^{12}$(provided) |
| Ex. 30 | 72 | — | 900 | 71 | $9.9 \times 10^{12}$(provided) |
| Ex. 31 | 74 | — | 900 | 71 | $9.9 \times 10^{12}$(provided) |
| Ex. 32 | 78 | — | 1,050 | 70 | $9.9 \times 10^{12}$(provided) |
| Ex. 33 | 76 | — | 900 1,200 | 74 | $9.9 \times 10^{12}$(provided) |
| Ex. 34 | 73 | 4.6 | 900 1,600 | 71 | $9.9 \times 10^{12}$(provided) |
| Comp. Ex. 1 | 86 | — | 430 | 10 | $9.9 \times 10^{12}$(provided) |
| Comp. Ex. 2 | 75 | — | 430 900 | 34 | $9.9 \times 10^{12}$(provided) |
| Comp. Ex. 3 | 41 | — | 700 | 82 | $9.9 \times 10^{12}$(provided) |
| Comp. Ex. 4 | 65 | — | 900 | 60 | $9.9 \times 10^{12}$(provided) |

Next, the resulting metal particles and heat ray-shielding materials were evaluated for their various properties as described above. The evaluation results are shown in Tables 3-1 to 3-3.

Figure 7:
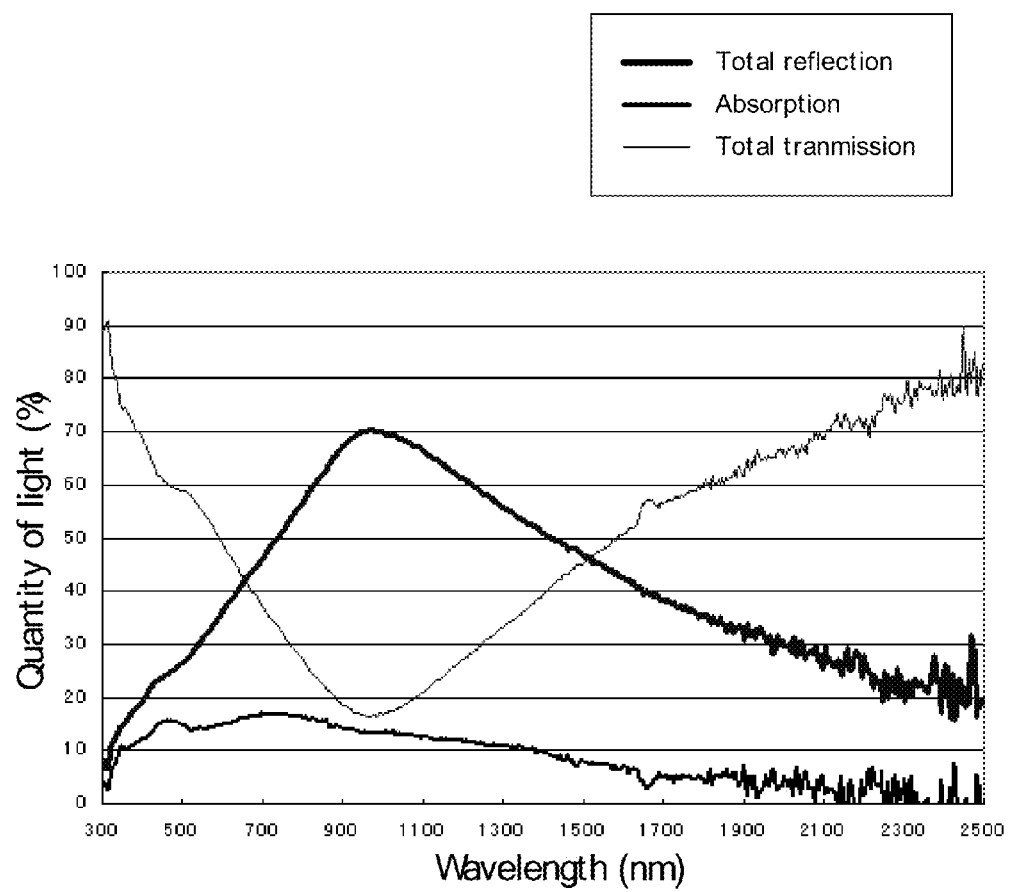
FIG. 7 is a graph illustrating a spectrum distribution of the heat ray-shielding material obtained in Example 35.

Here, the spectroscopic spectrum of the heat ray-shielding material obtained in Example 35 is illustrated in FIG. 7, which ad a visible light transmittance of 71.5%, a maximum reflectance wavelength of 1,015 nm, a maximum reflectance of 70%, and a haze degree of 7.6%.

Further, the metal particles and the heat ray-shielding materials of Examples 36 to 46 were evaluated in the same procedures of Example 35. The evaluation results are shown in Tables 3-1 to 3-3.

TABLE 3-1

| | Shape of particle | Rate of flat particles (% by number) | Average particle diameter (nm) | Average particle thickness (nm) | Aspect ratio | Coefficient of variation of particle size distribution | Randomness of inter-particle distance | Average inter-particle distance/Average particle diameter |
|---|---|---|---|---|---|---|---|---|
| Ex. 35 | Substantially hexagonal | 92 | 230 | 16 | 14.3 | 8% | having no peak | — |
| Ex. 36 | Substantially hexagonal | 89 | 210 | 18 | 11.7 | 10% | having no peak | — |
| Ex. 37 | Substantially hexagonal | 93 | 280 | 11 | 25.5 | 8% | having no peak | — |
| Ex. 38 | Substantially hexagonal | 94 | 310 | 9 | 34.4 | 9% | having no peak | — |
| Ex. 39 | Substantially hexagonal | 94 | 145 | 13 | 11.2 | 7% | having no peak | — |
| Ex. 40 | Substantially hexagonal | 93 | 170 | 10 | 17.0 | 8% | having no peak | — |
| Ex. 41 | Substantially hexagonal | 94 | 195 | 8 | 24.4 | 8% | having no peak | — |
| Ex. 42 | Substantially hexagonal | 94 | 115 | 10 | 11.5 | 7% | having no peak | — |
| Ex. 43 | Substantially hexagonal | 93 | 130 | 7 | 18.6 | 7% | having no peak | — |
| Ex. 44 | Substantially hexagonal | 90 | 340 | 16 | 21.3 | 11% | having no peak | — |
| Ex. 45 | Substantially hexagonal | 88 | 300 | 19 | 15.8 | 12% | having no peak | — |
| Ex. 46 | Substantially hexagonal | 92 | 230 | 16 | 14.3 | 8% | having no peak | — |

TABLE 3-2

| | Area ratio (%) | Thickness of shell (nm) | Tilt angle of particle (°) (Plane orientation) | Thickness of particle-containing layer (μm) | The number of particle layers | Inter-particle distance (μm) between adjacent metal particle-containing layers | Range of region where metal particle-containing layer is present < (λ/n)/4 |
|---|---|---|---|---|---|---|---|
| Ex. 35 | 45 | — | ±2° | 0.1 | 1 | — | A |
| Ex. 36 | 42 | — | ±2° | 0.1 | 1 | — | A |
| Ex. 37 | 46 | — | ±2° | 0.1 | 1 | — | A |
| Ex. 38 | 48 | — | ±2° | 0.1 | 1 | — | A |
| Ex. 39 | 41 | — | ±2° | 0.1 | 1 | — | A |
| Ex. 40 | 43 | — | ±2° | 0.1 | 1 | — | A |
| Ex. 41 | 43 | — | ±2° | 0.1 | 1 | — | A |
| Ex. 42 | 39 | — | ±2° | 0.1 | 1 | — | A |

TABLE 3-2-continued

| | Area ratio (%) | Thickness of shell (nm) | Tilt angle of particle (°) (Plane orientation) | Thickness of particle-containing layer (μm) | The number of particle layers | Inter-particle distance (μm) between adjacent metal particle-containing layers | Range of region where metal particle-containing layer is present < (λ/n)/4 |
|---|---|---|---|---|---|---|---|
| Ex. 43 | 42 | — | ±2° | 0.1 | 1 | — | A |
| Ex. 44 | 45 | — | ±2° | 0.1 | 1 | — | A |
| Ex. 45 | 46 | — | ±2° | 0.1 | 1 | — | A |
| Ex. 46 | 41 | — | ±20° | 0.3 | 1 | — | B |

TABLE 3-3

| | Visible light transmittance (%) | Haze (500 nm) (%) | Wavelength (nm) of maximum reflectance | Maximum reflectance (%) | Surface resistance value (Ω/square) (radio wave transmissivity) |
|---|---|---|---|---|---|
| Ex. 35 | 71.5 | 7.6 | 1,015 | 70 | $9.9 \times 10^{12}$(provided) |
| Ex. 36 | 72 | 8.1 | 850 | 76 | $9.9 \times 10^{12}$(provided) |
| Ex. 37 | 76.5 | 7.3 | 1,350 | 62 | $9.9 \times 10^{12}$(provided) |
| Ex. 38 | 74 | 7.2 | 1,650 | 57 | $9.9 \times 10^{12}$(provided) |
| Ex. 39 | 73.5 | — | 820 | 67 | $9.9 \times 10^{12}$(provided) |
| Ex. 40 | 77 | — | 1,050 | 60 | $9.9 \times 10^{12}$(provided) |
| Ex. 41 | 77.5 | — | 1,330 | 53 | $9.9 \times 10^{12}$(provided) |
| Ex. 42 | 74.5 | — | 835 | 51 | $9.9 \times 10^{12}$(provided) |
| Ex. 43 | 75 | — | 1,030 | 47 | $9.9 \times 10^{12}$(provided) |
| Ex. 44 | 71 | — | 1,250 | 75 | $9.9 \times 10^{12}$(provided) |
| Ex. 45 | 70.5 | — | 1,010 | 78 | $9.9 \times 10^{12}$(provided) |
| Ex. 46 | 69 | 10.2 | 1,015 | 30 | $9.9 \times 10^{12}$(provided) |

The heat ray-shielding material of the present invention has wide reflection wavelength selectivity and a wide reflection frequency band and is excellent in visible light transmission and radio wave transmission, and thus it can be suitably used as various members required to prevent transmission of heat ray, for example, as glass for vehicles such as automobiles and busses, and glass for buildings.

What is claimed is:

1. A heat ray-reflecting material comprising:
a metal particle-containing layer containing Ag particle,
wherein the Ag particle contains hexagonal or discoidal Ag flat particles in an amount of 60-85% by number, and the main planes of the Ag flat particles are oriented at an angle ranging from ±2° to ±30° relative to one surface of the metal particle-containing layer,
wherein the Ag flat particles have an average particle diameter of 70 nm to 500 nm, and
wherein the Ag flat particles have an aspect ratio of the average particle diameter to an average particle thickness of 2 to 60.

2. The heat ray-reflecting material according to claim 1, wherein a coefficient of variation in a particle size distribution of the Ag flat particles is 30% or less.

3. The heat ray-reflecting material according to claim 1, wherein when the metal particle-containing layer is viewed from a perpendicular direction, an area ratio [(B/A)×100] is 15% or more, where A is a total projected area of the metal particle-containing layer, and B is a sum value of projected areas of the Ag flat particles.

4. The heat ray-reflecting material according to claim 1, wherein a plurality of the metal particle-containing layers are laminated, and a distance between the metal particle-containing layers present adjacent to each other is 15 μm or more.

5. The heat ray-reflecting material according to claim 1, wherein the Ag flat particles are coated with a high refractive index material.

6. The heat ray-reflecting material according to claim 1, wherein the heat ray-reflecting material has a maximum value of solar radiation reflectance in a wavelength range of 600 nm to 2,000 nm.

7. The heat ray-reflecting material according to claim 1, wherein the heat ray-reflecting material has a visible light transmittance of 60% or higher.

8. The heat ray-reflecting material according to claim 1, wherein an average inter-particle distance between adjacent Ag flat particles in the metal particle-containing layer in a horizontal direction thereof is 1/10 or more of the average particle diameter of the Ag flat particles.

* * * * *